UNITED STATES PATENT OFFICE.

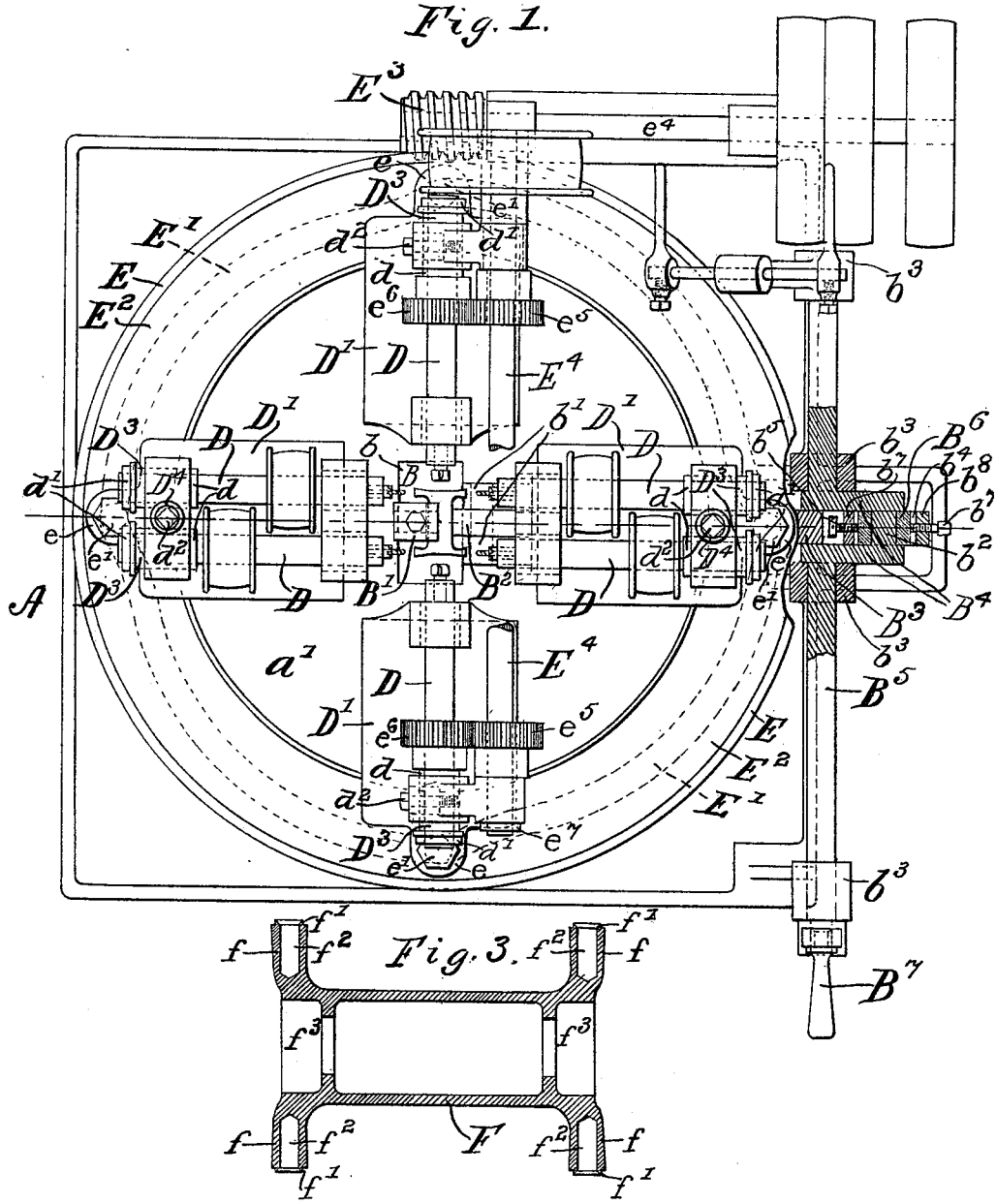

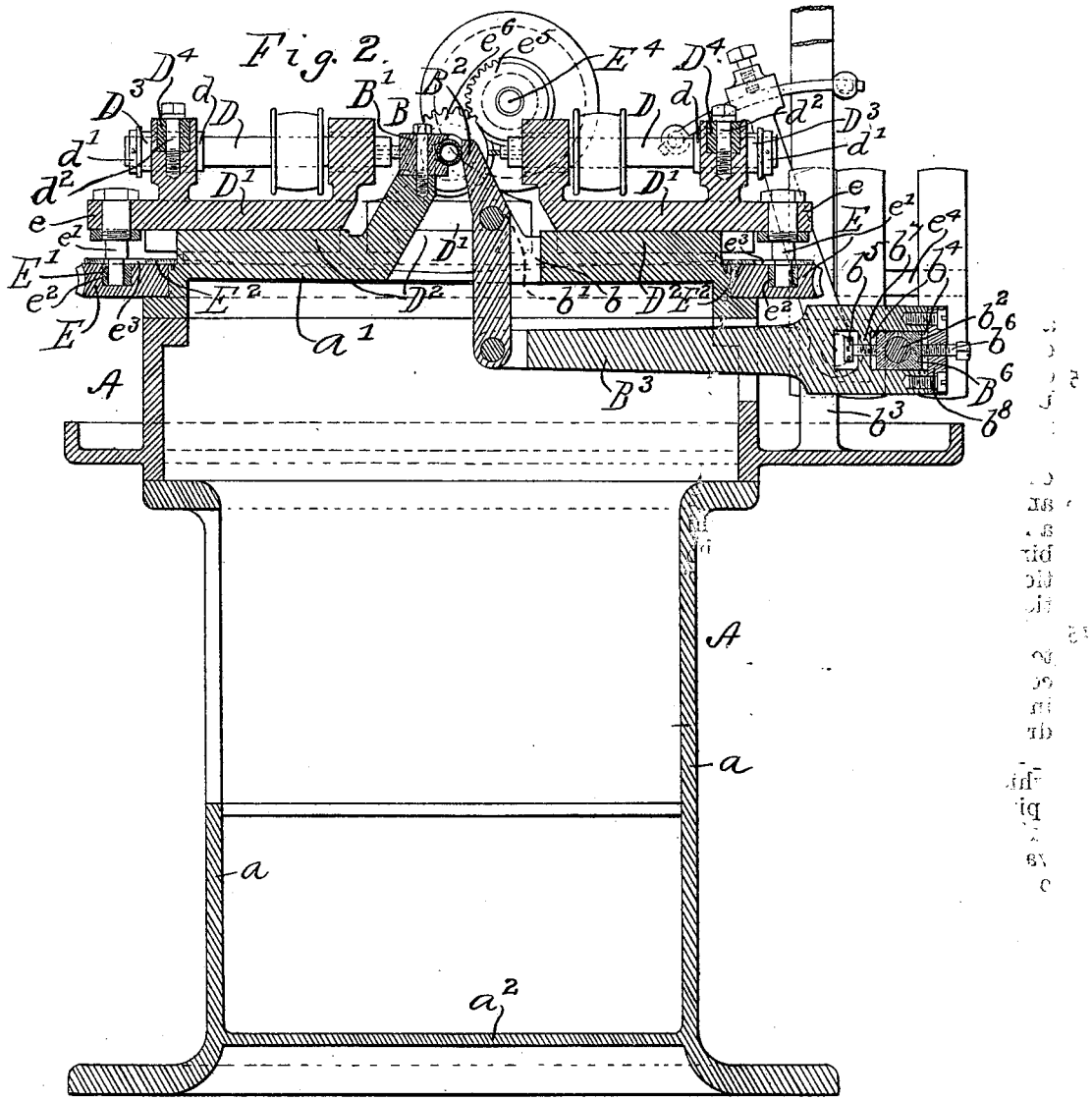

WALTER B. PEARSON, OF CHICAGO, ILLINOIS.

DRILLING AND FACING MACHINE.

SPECIFICATION forming part of Letters Patent No. 613,225, dated October 25, 1898.

Application filed February 15, 1897. Serial No. 623,517. (No model.)

*To all whom it may concern:*

Be it known that I, WALTER B. PEARSON, a citizen of the United States, and a resident of Chicago, in the county of Cook and State of Illinois, have invented a new and useful Drilling and Facing Machine, of which the following is a specification.

This invention relates to an improved machine for drilling and facing bicycle-pedals; and the object of the invention is to provide a machine for this purpose which shall combine the features of simplicity of construction with uniformity and accuracy of operation and which will have a large capacity.

In the preferable form thereof now known to me a machine embodying my invention comprises a centrally-located vise or chuck, in which the pedal is supported during the drilling and facing operation; a plurality of spindles arranged around said vise or chuck which carry the drilling and facing tools, said spindles being supported in such manner that said drilling and facing tools may be advanced toward and retracted from said vise or chuck; means for automatically advancing and retracting said drilling and facing-tools, and means for operating the chuck or vise and for starting and stopping the feed mechanism. As shown, the drill and facing-tool spindles are adjustably mounted in suitable heads or slides fitted to and movable toward and from the vise or chuck on fixed guides or ways, and the feeding mechanism consists of a ring or disk revolubly mounted on the frame or base of the machine, a cam-groove formed therein, to which is fitted rigid projections, formed one on each of the spindle-slides, the shape of said cam-groove being such as to impart a desired reciprocating movement to said spindles. In the preferable construction shown, also, the vise or chuck is operated by the same device which controls the feed, so that opening said vise or chuck will stop and closing said vise or chuck will start the feed mechanism.

The invention also consists of the various other features, combinations of features, and details of construction hereinafter described and then pointed out in the claims.

In the accompanying drawings a machine embodying my invention is fully illustrated.

Figure 1 is a top plan view of the machine. Fig. 2 is a vertical sectional view thereof on the line 2 2 of Fig. 1, and Fig. 3 is a sectional view of a piece for finishing which the machine shown is specially adapted.

Referring now to the drawings, A designates the frame or base of the machine, comprising side walls $a$ and a top $a'$. In the preferable construction shown the sides $a$ are made solid, and the hollow interior of said frame or base A is closed by a bottom $a^2$, thus forming a well or reservoir adapted to contain soda-water, oil, or other lubricant for the drills and facing-tools.

Supported upon the top $a'$ of the machine-frame A, preferably at about the center thereof, is a vise or chuck B, comprising a fixed jaw $B'$ and a jaw $B^2$, the lower end of which projects through a hole or opening $b$, formed in the top $a'$ of the machine, and is pivoted between its ends to lugs or projections $b'$, formed on said top $a'$ of the machine-frame.

Pivoted to the lower end of the chuck-jaw $B^2$ is one end of a connecting-rod $B^3$, the opposite end of which is connected to the crank-pin $b^2$ of a crank $B^4$, secured to a shaft $B^5$, supported in brackets $b^3$, formed on the machine-frame in proper position.

In the preferable construction shown the operative length of the connecting-rod is adjustable, thus adapting the machine to work varying slightly in size. To this end the connection between said connecting-rod and the crank-pin $b^2$ comprises a sleeve or bushing $B^6$, fitted to said crank-pin, said sleeve or bushing being in turn fitted to and longitudinally movable in a slot $b^4$, formed in the end of said connecting-rod and being maintained in adjusted position by means of binding-screws $b^5$ $b^6$, one of which is threaded through a web $b^7$, formed integral with the connecting-rod, and the other through a head $b^8$, secured to the end thereof. The shaft $B^5$ is provided at its forward end with a hand-crank $B^7$, by means of which the jaw $B^2$ can be quickly opened and closed.

To insure that successive pieces of work will be secured in the machine in the same position, the chuck B is provided with a notch or recess adapted to receive the work and with pins or stops, (not shown,) which define the position thereof, all in a familiar manner.

The hole or opening $b$ in the top of the machine-frame is sufficiently large and is so located that as a piece is released from the vise or chuck B it will fall through said opening $b$ into a pan or drawer supported within the frame of the machine beneath said hole or opening upon cleats or ways formed on the sides thereof. An opening is formed in one side of the machine-frame through which said drawer or pan may be inserted and withdrawn. Suitable holes are formed in the bottom of the pan to allow the lubricant used on the drills and facing-tools to drain from the work into the well in the bottom of the machine-frame A. Preferably, also, the top $a'$ of the machine-frame is depressed adjacent to the hole or opening $b$, so that the lubricant used on the drills and facing-tools will run into the interior of the machine-frame A.

My improved machine also comprises a plurality of spindles D, arranged about the vise or chuck B, said spindles being longitudinally movable and means being provided to advance them toward and to retract them from the work. Preferably, also, said spindles are supported in such manner that the positions of the inner ends thereof may be adjusted relatively to the work independently of each other.

The machine shown has six spindles D, the axes of which are in the same plane, and which comprise two spindles arranged one at each end of the work in axial alinement therewith and with each other and two spindles arranged on each side of the work, the axes of which are perpendicular to the axis of the work, and which are arranged in pairs which are in alinement with each other. In the preferable construction shown the spindles D are supported in slides or heads $D'$, fitted to and longitudinally movable on guides or ways $D^2$, formed on the frame of the machine. Spindles located on the same side of the vise or chuck B have the same feed and are mounted in the same head.

To provide for independent longitudinal adjustment of the spindles D relatively to the work, the rear bearings of said spindles comprise straight bushings $D^3$, fitted to and longitudinally adjustable in suitable seats or bearings formed in the heads $D'$. The spindles D are secured against longitudinal movement in said bushings $D^3$ by means of collars $d$, formed on said spindles, which bear against the inner ends of said bushings and operate to take the thrust due to the operation of the machine, and nuts $d'$, threaded to said spindles and which bear against the outer ends of said bushings $D^3$. It is obvious that longitudinal movement of said bushings $D^3$ will effect a longitudinal adjustment of the spindles D. The bushings $D^3$ are secured in the heads or slides $D'$ by means of caps $D^4$ and binding-screws $d^2$ in a familiar manner.

The feed mechanism of the machine is as follows: Fitted to a circular bearing formed at the top of the machine-frame A, the center of which is coincident with the point of intersection of the axis of the work with a line parallel with and equidistant from the axes of the side spindles, is a ring or disk E, the axis of rotation of which is perpendicular to the plane of the axes of the spindles D. Formed in the upper surface of the ring or disk E is a cam-groove $E'$, which comprises four similar sections or quadrants. Projections $e$, formed on the heads or slides $D'$, extend outwardly over said ring or disk E, and secured therein are rigid studs $e'$, which engage the cam-groove $E'$. As shown, anti-friction-rollers $e^2$ are mounted on the studs $e'$ to decrease the frictional engagement between said studs and said cam-groove. A ring or plate $E^2$, secured to the frame A, extends over the upper surface of the ring or disk E and prevents chips and other objects from falling into the cam-groove $E'$, formed therein. Radial slots $e^3$, formed in the plate or ring $E^2$, allow desired movement of the heads or slides $D'$. The relation of parts is such that the projections $e$ on the heads or slides $D'$ are located at angles of ninety degrees from each other. From this construction and from the fact that the cam-groove $E'$ consists of four similar sections or quadrant, it results that as the ring E rotates the same movement is imparted to each of the heads or slides $D'$ and to the tools carried thereon. From this construction it also results that continuous rotation of the ring or disk E will operate to impart a uniform and simultaneous reciprocating movement to the heads $D'$, and thus to the spindles D. All of the tools are adjusted or set with reference to the end of their cuts.

Any suitable means may be employed for rotating the ring or disk E. In the construction shown a worm-gear is formed in the periphery of said ring or disk, with which a worm $E^3$ engages. The worm $E^3$ is carried on a shaft $e^4$, which may be driven from any suitable source of power.

The drill and facing-tool spindles D are all driven from the counter-shaft of the machine. The side spindles are belted directly to said counter-shaft. The end spindles are driven from a shaft $E^4$, mounted in suitable bearings in the end heads $D'$, like gears $e^5$, on which engage other like gears $e^6$ on said end spindles. To provide for necessary longitudinal movement of the end heads $D'$ relatively to each other, the shaft $E^4$ is splined to the driving-pulley $E^5$, and said driving-pulley is provided with a sleeve, which projects through the bearing in the head $D'$, and one of the gears $e^5$ is secured to the projecting end thereof. The driving-pulley will thus be maintained in fixed position relatively to said head. The shaft $E^4$ is secured against longitudinal movement in the other end head $D'$ by one of the gears $e^5$ and a collar $e^7$, both of which are rigidly secured thereto on opposite sides of the bearing of said shaft $E^4$. The worm-shaft $e^4$ preferably forms an independent counter-shaft driven from the main counter-shaft of the machine. Preferably, also, the belt which drives the shaft $e^4$ is shifted by means of the crank-shaft $B^5$, the relation of parts being such that turning said shaft $B^5$ to close the vise or chuck B will shift the driving-belt of the shaft $e^4$, so as to drive said shaft, and opening said vise or chuck will stop the shaft. Preferably, also, the relation of parts is such that the belt driving said shaft $e^4$ will not be shifted to the tight pulley on said shaft until the vise or chuck B is clamped upon the work. To effect this, the fingers of the belt-shipper are located at a distance from each other considerably greater than the width of the belt, and the relation and adjustment of parts are such that the vise or chuck B will be clamped upon the work when the crank $B^4$ is at its dead-point. The relation and adjustment of parts are such also that the shipper-finger will come into contact with the belt to shift it to the driving-pulley just before said crank reaches its dead-point. Further rotation of said rod $B^5$ will have very little effect upon the vise or chuck, but will operate to shift the belt to the tight pulley.

In order that my machine may be readily and thoroughly understood, I have in Fig. 3 of the drawings shown that portion of a pedal which my machine is adapted to finish, which I will now describe, together with the operations thereon which my machine is adapted to perform.

The portion of the pedal which my machine is intended to finish may be designated as the "frame" thereof, and comprises an axial shell or hollow hub F, at each end of which are formed opposite arms $f$, to which the pedal-bands are attached. Said frame is preferably made of malleable iron or other suitable cast metal.

The operations which my machine is adapted to perform are as follows: to face off the ends of the arms $f$, leaving short circular projections $f'$ thereon; to drill holes $f^2$ in the ends of said arms concentric with said projections $f'$, and, lastly, to dress out the sockets $f^3$ to receive the thimbles for the pedal-bearings.

I claim—

1. In a drilling and facing machine, the combination of a vise or chuck, a crank-shaft for operating said vise or chuck, a plurality of longitudinally-movable spindles arranged about said vise or chuck, a feed mechanism adapted to impart a reciprocating movement to said spindles toward and from said vise or chuck, said feed mechanism being driven independently of the spindles by means controlled by the crank-shaft of the vise or chuck in such manner that closing said vise or chuck will start said feed mechanism and opening said vise or chuck will stop said feed mechanism, substantially as described.

2. In a drilling and facing machine, the combination of a vise or chuck, a crank-shaft for operating said vise or chuck, a plurality of spindles arranged about said vise or chuck, heads or slides in which said spindles are mounted, guides or ways to which said heads or slides are fitted and along which they are movable toward and from said vise or chuck, a feed mechanism adapted to impart a reciprocating movement to said heads or slides toward and from said vise or chuck, said feed mechanism being driven independently of the spindles by means controlled by suitable connection with the crank-shaft of the vise or chuck whereby closing said vise or chuck will start said feed mechanism and opening said vise or chuck will stop said feed mechanism, substantially as described.

3. In a drilling and facing machine, the combination of a vise or chuck comprising a pivoted jaw, a crank-shaft for operating said vise or chuck, a plurality of longitudinally-movable spindles arranged about said vise or chuck, a feed mechanism adapted to impart a reciprocating movement to said spindles toward and from said vise or chuck, said feed mechanism being driven independently of the spindles by means controlled by the crank-shaft of the vise or chuck in such manner that closing the vise or chuck will start said feed mechanism and opening said vise or chuck will stop said feed mechanism, the space beneath said vise or chuck being unoccupied and a hole or opening in the top of the machine-frame beneath said vise or chuck, through which a piece of work may fall when released from said vise or chuck, substantially as described.

4. In a drilling and facing machine, the combination of a vise or chuck, heads or slides arranged about said vise or chuck, ways or guides to which said heads or slides are fitted and along which they are movable toward and from said vise or chuck, spindles revolubly mounted in said heads or slides, a ring or disk revolubly mounted on a suitable bearing formed on the machine-frame, a continuous cam-groove formed therein, studs on the spindle heads or slides which engage said cam-groove, means to rotate said spindles and means to rotate said cam-ring, substantially as described.

5. In a drilling and facing machine, the combination of a vise or chuck, heads or slides arranged about said vise or chuck, ways or guides to which said heads or slides are fitted and along which they are movable toward and from said vise or chuck, spindles revolubly mounted in said heads or slides, a ring or disk revolubly mounted on a suitable bearing formed on the frame of the machine, a cam-groove formed therein, studs on the spindle heads or slides which engage with said cam-groove and means to rotate said cam ring or disk whereby said ring or disk may be started and stopped independently of the spindles, substantially as described.

6. In a drilling and facing machine, the combination of a vise or chuck, heads or slides arranged about said vise or chuck, ways or guides to which said heads or slides are fitted and along which they are movable toward and from said vise or chuck, spindles revolubly mounted in said heads or slides, a ring or disk revolubly mounted on a suitable bearing formed on the frame of the machine, a cam-groove formed therein, studs on the spindle heads or slides which engage with said cam-groove, means to rotate said cam ring or disk such that said ring or disk may be started and stopped independently of the spindles, the space beneath said vise or chuck being unoccupied and a hole or opening being formed in the top of the machine-frame beneath said vise or chuck through which a piece of work may fall when released from said vise or chuck, substantially as described.

7. In a drilling and facing machine, the combination of a vise or chuck, comprising a pivoted jaw, a crank-shaft supported in suitable bearings on the frame of the machine, a connecting-rod pivoted to the pivoted jaw of the chuck at one end and connected with the crank of the crank-shaft at the other, heads or slides fitted to and movable toward and from said vise or chuck on suitable guides or ways, spindles mounted in said heads or slides, a ring or disk revolubly mounted on a suitable bearing formed on the frame of the machine, studs on the spindle heads or slides which engage a cam-groove formed in said ring or disk, said cam-groove being of such shape that it will impart a reciprocating movement to said heads or slides toward and from said vise and means to rotate said cam ring or disk controlled by suitable connection with the crank-shaft of the vise or chuck, whereby closing said vise or chuck will start and opening said vise or chuck will stop the cam-ring-rotating mechanism, substantially as described.

8. In a drilling and facing machine, the combination of a vise or chuck, comprising a pivoted jaw, a crank-shaft for operating said vise or chuck, heads or slides arranged about said vise or chuck, ways or guides to which said heads or slides are fitted and along which they are movable toward and from said vise or chuck, spindles revolubly mounted in said heads or slides, a ring or disk revolubly mounted on a suitable bearing formed on the frame of the machine, studs on the spindle heads or slides which engage with a cam-groove formed in said ring or disk, said cam-groove being of such shape that it will impart a reciprocating movement to said heads or slides toward and from said vise or chuck, means to rotate said cam ring or disk controlled by the vise-operating shaft in such manner that closing said vise or chuck will start and opening said vise or chuck will stop said cam-ring-rotating mechanism, the space beneath the vise or chuck being unoccupied and a hole or opening being formed in the machine-frame beneath said vise or chuck through which a piece of work may fall when released from said vise or chuck, substantially as described.

9. In a drilling and facing machine, the combination of a vise or chuck, heads or slides arranged about said vise or chuck, ways or guides to which said heads or slides are fitted and along which they are movable toward and from said vise or chuck, spindles revolubly mounted in said heads or slides, a ring or disk revolubly mounted on a suitable bearing formed on the frame of the machine, a cam-groove formed therein, studs on the spindle heads or slides which engage said cam-groove, a worm-gear formed on the periphery of said cam ring or disk and a worm which engages with said worm-gear, the worm-shaft being driven and controlled independently of the spindles of the machine, substantially as described.

10. In a drilling and facing machine, the combination of a vise or chuck, comprising a pivoted jaw, a connecting-rod pivoted at one end to said pivoted jaw and connected at its other end to the crank of a crank-shaft mounted in suitable bearings on the machine-frame, heads or slides arranged about said vise or chuck, ways or guides to which said heads or slides are fitted and along which they are movable toward and from said vise or chuck, a ring or disk revolubly mounted on a suitable bearing formed on the machine-frame, a cam-groove formed therein, studs on the spindle heads or slides which engage cam-groove, a worm-gear formed in the periphery of said cam ring or disk, a worm which engages with said worm-gear, said worm being carried on a shaft which is driven independently of the spindles of the machine and connection between the crank-shaft of the vise and the worm-shaft-driving mechanism, whereby closing said vise or chuck will start said worm and opening said vise or chuck will stop said worm, substantially as described.

11. In a drilling and facing machine, the combination of a vise or chuck, heads or slides arranged about said vise or chuck, spindles revolubly mounted in said heads or slides, guides or ways to which said heads or slides are fitted and along which they are movable toward and from said vise or chuck, a ring or disk revolubly mounted on a suitable bearing formed on the machine-frame, a cam-groove formed therein comprising a plurality of similar sections, studs on the spindle heads or slides which engage with said cam-groove and means to rotate said cam ring or disk, substantially as described.

12. In a drilling and facing machine, the combination of a vise or chuck, a hole or opening in the machine-frame beneath said vise or chuck, heads or slides arranged symmetrically about said vise or chuck, guides or ways to which said heads or slides are fitted and along which they are movable toward and from said vise or chuck, a ring or disk revolubly mounted on a suitable bearing formed on the machine-frame, a cam-groove formed therein, comprising as many similar sections as there are spindle heads or slides, studs on said spindle heads or slides which engage with said cam-groove and means to rotate said cam ring or disk, substantially as described.

13. In a drilling and facing machine, the combination of a vise or chuck, a shaft for operating said vise or chuck, a plurality of spindles arranged about said vise or chuck, heads or slides in which said spindles are mounted, guides or ways to which said heads or slides are fitted and along which they are movable toward and from the vise or chuck, a feed mechanism adapted to impart a reciprocating movement to said heads or slides toward and from said vise or chuck, said feed mechanism being driven independently of the spindles and the driving-belt thereof being controlled by shipper-fingers on the crank-shaft of the vise or chuck, said shipper-fingers being separated by a space considerably larger than the width of the driving-belt and the relation and adjustment of parts being such that the chuck is fully closed when the crank is at its dead-point and such also that the shipper-fingers will come into contact with the belt to shift it to the tight pulley just before it reaches its dead-point, substantially as described.

In testimony that I claim the foregoing as my invention I have hereunto set my hand this 11th day of February, 1897.

WALTER B. PEARSON.

Witnesses:
BYRON B. CARTER,
G. L. BURKHARDT.